US010140593B2

(12) United States Patent
De Mel et al.

(10) Patent No.: US 10,140,593 B2
(45) Date of Patent: Nov. 27, 2018

(54) SYSTEM, METHOD AND RECORDING MEDIUM FOR DOORBELL CONTROL BASED ON DOORBELL DATA AND CALENDAR DATA

(71) Applicant: International Business Machines Corporation, Armonk, NY (US)

(72) Inventors: Geeth Ranmal De Mel, Chester (GB); James Robert Kozloski, New Fairfield, CT (US); Clifford A. Pickover, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 5 days.

(21) Appl. No.: 15/224,332

(22) Filed: Jul. 29, 2016

(65) Prior Publication Data

US 2018/0033287 A1    Feb. 1, 2018

(51) Int. Cl.
*G08B 3/10* (2006.01)
*G06Q 10/10* (2012.01)

(52) U.S. Cl.
CPC .......... *G06Q 10/1093* (2013.01); *G08B 3/10* (2013.01)

(58) Field of Classification Search
CPC ...................................................... G08B 21/22

USPC ....................................................... 340/686.6
See application file for complete search history.

(56) References Cited

U.S. PATENT DOCUMENTS

| | | | | |
|---|---|---|---|---|
| 6,438,221 | B1* | 8/2002 | Lee ........................... | G08B 3/10 379/159 |
| 9,497,572 | B2* | 11/2016 | Britt ........................... | G06F 8/36 |
| 2015/0319411 | A1* | 11/2015 | Kasmir ............ | G08B 13/19684 348/143 |
| 2016/0189491 | A1* | 6/2016 | Sloo ......................... | G08B 5/36 340/686.6 |
| 2016/0247344 | A1* | 8/2016 | Eichenblatt ........... | A47G 29/141 |
| 2016/0261425 | A1* | 9/2016 | Horton ................... | G05B 15/02 |

OTHER PUBLICATIONS

Mel, et al. "The NIST Definition of Cloud Computing". Recommendations of the National Institute of Standards and Technology. Nov. 16, 2015.

* cited by examiner

*Primary Examiner* — Qutbuddin Ghulamali
(74) *Attorney, Agent, or Firm* — Rahan Uddin, Esq.; McGinn IP Law Group, PLLC

(57) ABSTRACT

A doorbell control method, system, and non-transitory computer readable medium for a doorbell, include causing a doorbell to perform a differentiated action based on doorbell data and calendar data of an electronic calendar, and annotating the calendar with information based on an activation of the doorbell.

19 Claims, 4 Drawing Sheets

BIDERECTIONAL COMMUNICATION METHOD 100

SYSTEM, METHOD AND RECORDING MEDIUM FOR DOORBELL CONTROL BASED ON DOORBELL DATA AND CALENDAR DATA

BACKGROUND

The present invention relates generally to a doorbell control method, and more particularly, but not by way of limitation, to a doorbell control system, method, and recording medium between a door bell and a calendar to cause a doorbell to perform an action based on the calendar and doorbell data, and to annotate the calendar with information about a condition based on an activation of the doorbell.

A doorbell is a signaling device typically placed near an entry door to a building. When a visitor presses a button or activates the doorbell, the bell rings inside the building, alerting the occupant to the presence of the visitor. Although the first doorbells were mechanical, activated by pulling a cord, etc., modern doorbells are electric in that they are actuated by an electric switch.

Conventionally, doorbells only perform the action of emitting an alert when the doorbell is activated to alert the user of someone at the door. Then, the doorbell ringer waits at the door until the user responds.

For example, some conventional techniques consider a doorbell alarm with an alternative speech record/playback assembly. Upon depression of the exterior button extending through an exterior housing adjacent a building entrance, the technique can either energize the doorbell or urge the visitor to leave a recorded message for subsequent playback. The doorbell and/or record modes are selected by the user by a switch located within an interior housing mounted adjacent a building entrance. The housings include the appropriate components and wiring to provide the doorbell and record/playback functions.

Thus, the needs in the art include needs to not require a direct response to an activation of the doorbell (e.g., user answering the door) in a certain period before the doorbell ringer leaves that may cause the user to miss the doorbell ringer.

SUMMARY

In an exemplary embodiment, the present invention can provide a computer-implemented doorbell control method, the method including causing a doorbell to perform a differentiated action based on doorbell data and calendar data of an electronic calendar, and annotating the calendar with information based on an activation of the doorbell.

Further, in another exemplary embodiment, the present invention can provide a non-transitory computer-readable recording medium recording a doorbell control program, the program causing a computer to perform: causing a doorbell to perform a differentiated action based on doorbell data and calendar data of an electronic calendar, and annotating the calendar with information based on an activation of the doorbell.

Even further, in another exemplary embodiment, the present invention can provide a doorbell control system, said system including a processor, and a memory, the memory storing instructions to cause the processor to: cause a doorbell to perform a differentiated action based on doorbell data and calendar data of an electronic calendar, and annotate the calendar with information based on an activation of the doorbell.

There has thus been outlined, rather broadly, an embodiment of the invention in order that the detailed description thereof herein may be better understood, and in order that the present contribution to the art may be better appreciated. There are, of course, additional exemplary embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

DETAILED DESCRIPTION

Figure 1:
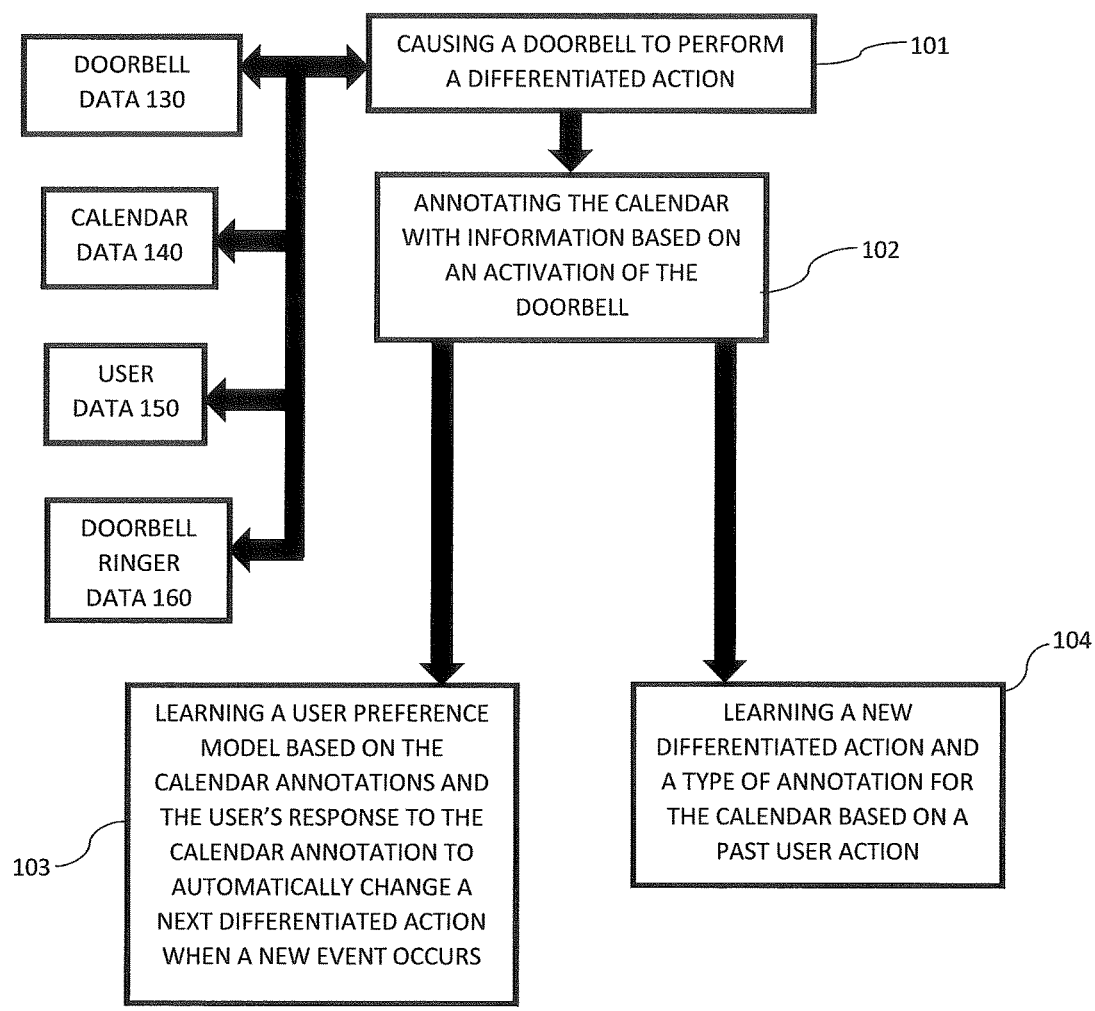
FIG. 1 shows a high-level flow chart for a doorbell control according to an embodiment of the present invention.

The invention will now be described with reference to FIGS. 1-4, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

With reference now to FIG. 1, an embodiment of a doorbell control method 100 according to the present invention includes various steps to associate doorbell data with calendar data of a user to cause the doorbell to perform a differentiated action based on the association, annotate the calendar based on the activation of the doorbell, and/or learn user preferences or new differentiated actions for the doorbell to improve the interaction with the user and the doorbell over time. That is, the method 100 includes various steps to improve a response time of a user to the doorbell or to improve a user's awareness of doorbell activity when the user does not respond to the door via a calendar annotation. As shown in at least FIG. 2, one or more computers of a computer system 12 can include a memory 28 having instructions stored in a storage system to perform the steps of FIG. 1.

Thus, method 100 according to an embodiment of the present invention may act in a more sophisticated and useful fashion, and in a cognitive manner while giving the impression of cognitive mental abilities and processes related to knowledge, attention, memory, judgment and evaluation, reasoning, and advanced computation. That is, a system is said to be "cognitive" if it possesses macro-scale properties—perception, goal-oriented behavior, learning/memory and action—that characterize systems (i.e., humans) that are generally agreed as cognitive.

Figure 2:
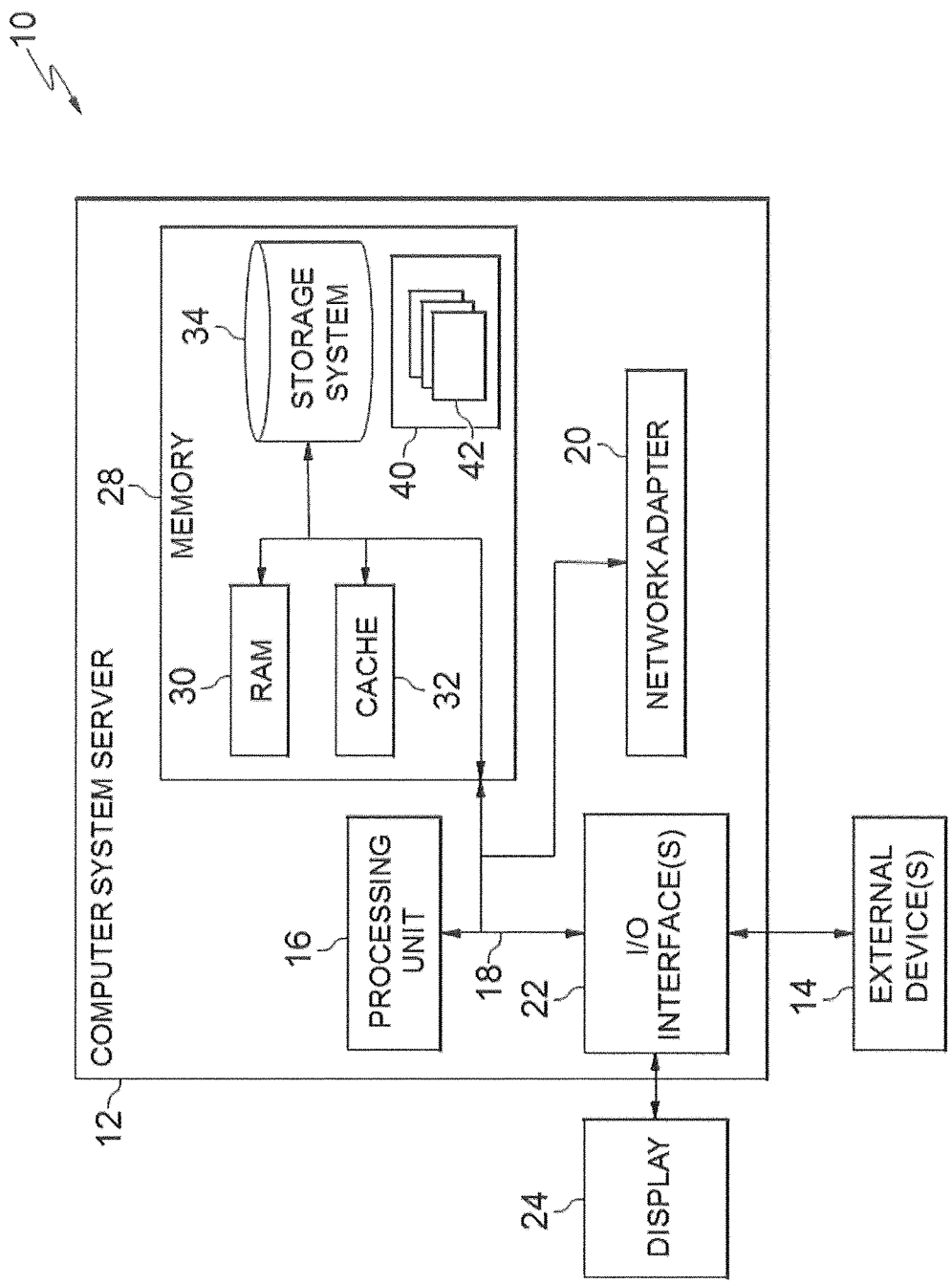
FIG. 2 depicts a cloud computing node according to an embodiment of the present invention.

Although FIG. 2 depicts an exemplary cloud computing node 10 (FIG. 3) as a computer system/server 12 cloud environment 50 as a general-purpose computing circuit which may execute in a layer of the doorbell control system method (FIG. 4), it is noted that the present invention can be implemented outside of the cloud environment.

With reference now to FIG. 1, an embodiment of a doorbell control method 100 receives doorbell data 130, calendar data 140, user data 150, and doorbell ringer data 160.

The doorbell includes, for example, a push-button interface to a home, loading dock, place of work, etc.

The doorbell data 130 can include, for example, a time when the doorbell is activated, a time when the doorbell will be activated (as described later), Internet of Things (IoT) data from the doorbell being IoT-enabled, face recognition data, communication data with a smartphone of the doorbell ringer, voice recognition, a location of the doorbell (e.g., a front-door, a back-door, garage, etc.), etc.

The calendar data 140 can include user events and a time of the user events such that the method 100 can determine a current activity of the user. For example, the calendar data 140 includes meeting information (with topic, attendees, importance level, time/date, etc.), a time period set aside by a user for a nap, dining, watching television, being away from home, holiday information, etc.

Electronic calendars may have rich information on user activity such as when the user is home, asleep, in a meeting, in a situation that is interruptible (uninterruptable). Such information may also be used to glean additional context such as when the user is likely to be asleep, eating dinner, at work. For example, if the user typically eats dinner every day between certain hours and the doorbell rings during those hours, the calendar data 140 can be used by the method 100 to perform an action based on the probability that the user is eating dinner (as described later). Or, if the user is always in the backyard and cannot hear the doorbell during a particular time, the method 100 can perform a different action to help the user answer the doorbell (as described later). The calendar data 140 can also include multiple calendars for individuals residing in a same location as the doorbell (e.g., two people living in the same home).

The user data 150 can include information about the user such as a current location of the user (e.g., as detected via IBM Presence™, a Global Positioning System (GPS)-enabled device, etc.), biographical information such as an age, health (such as hearing-impaired), movement ability (e.g., to determine a response time to a doorbell), etc., user preferences such as a type of notification from the doorbell, an action to take if the user cannot answer the doorbell, or the like.

The doorbell ringer data 160 can include information about the user who has activated the doorbell (or is expected to activate the doorbell). The doorbell ringer data 160 can be automatically transmitted to the method 100 using known technologies such as radio frequency identification (RFID) and near field communication (NFC). Also, additional automated mechanisms can be employed to collect doorbell ringer data 160, such as face recognition, communication with the smartphone of the doorbell ringer, voice recognition, fingerprint data, etc. Also, the doorbell ringer data 160 can include a time when the doorbell ringer will arrive at the doorbell. For example, a delivery schedule can indicate an expected time that the delivery person will arrive at a location of the doorbell and the doorbell ringer data 160 can include the timing.

It is noted that the doorbell can be connected to the calendar via a bidirectional interface that can be wired or wireless.

In step 101 the doorbell performs a differentiated action based on the doorbell data 130 and the calendar data 140. Step 101 can also include the doorbell performing a differentiated action based on the user data 150 and the doorbell ringer data 160.

The differentiated action can include, for example, muting the doorbell (e.g., if the user is not able to answer), changing a volume of the notification emitted by the doorbell, changing other audio characteristics of the doorbell, converting an audio signal to a visual signal (e.g. a flashing light or blinking light or a notification in an IoT-enabled device), conveying an automated message to the person pressing the doorbell, sending information to an IoT enabled device, sending information to a hearing aid, etc.

In other words, in step 101 the doorbell can perform a plurality of different actions based on a relationship between the doorbell data 130, the calendar data 140, the user data 150, and the doorbell ringer data 160 such as not emitting audio if the calendar data 140 indicates that the user is not home, causing the user's smartphone to vibrate if the calendar data 140 indicates that the user is in the backyard, causing the doorbell to emit a "do not disturb" message, etc.

In other words, step 101 can include differentiated actions to perform based on a relationship between what the user is currently doing as determined from calendar data 140 and/or user data 150 to the doorbell data 130 and the doorbell ringer data 160.

For example, the calendar data 130 can indicate that the user is busy and Step 101 sends a signal to the doorbell (e.g., performs a differentiated action to send the signal) so as to optionally change the doorbell's light to indicate a calendar-specified state such as (eating dinner, having a meeting, do not disturb, napping, working, etc.). It is noted that the user can determine the signal based on privacy concerns (e.g., sending a "napping" indication to a relative but not to an unidentified doorbell ringer).

For example, if the calendar data 140 indicates a person is busy, a prerecorded a message for the doorbell ringer can be trigged telling the doorbell ringer (e.g., a delivery person) to leave the package at the door. That is, based on the doorbell ringer data 160 indicating that the doorbell ringer is the delivery person, Step 101 plays a message just for him when he presses the doorbell. If desired, for additional authentication, Step 101 can request further verification of identity or the correct package by requesting that the delivery person show an RFID tag that is scanned along with the doorbell ringer's face.

In one embodiment, the differentiated action can include causing the door to unlock to let the doorbell ringer enter in an instance when the doorbell ringer data 160 indicates that the doorbell ringer is a known user that is allowed to enter (e.g., a child who does not want to be trusted with a key, but who can be allowed to enter when they activate the doorbell). That is, Step 101 can cause the doorbell to communicate with other IoT-enabled devices to cause the IoT-enabled devices to perform the differentiated action.

In another embodiment, the user data 150 can control the differentiated action when combined with the calendar data 140 and doorbell data 130. For example, if the user is hearing impaired and cannot hear the doorbell but doorbell data 130 indicates a time of the doorbell being activated when the user is home as found in the calendar data 130, Step 101 can perform a differentiated action that causes the user's hearing aid to vibrate or emit a sound.

In one embodiment, the differentiated action can comprise a proactive doorbell signal that is performed in advance of the doorbell ringer actually arriving at the doorbell. That is, Step 101 can use the calendar data 140 such as when a doorbell ringer is expected to arrive and doorbell ringer data 160 such as location information provided by a delivery service, a rider service, and proactively ring the doorbell. The proactive ringing of the doorbell may be performed a time when the estimated time of door arrival for both parties is equal. If a doorbell owner is sleeping, for example, the proactive doorbell signal may occur several times acting as an alarm clock, and leaving enough time for the owner to reach the door to greet the visitor. Of course, the sound emitted by the doorbell during the proactive stage may differ from the sound when the person is actually outside the door.

Similarly, the proactive doorbell signal can be based on user data 150 such as a health condition of the user or a location of the user in the home. For example, if the user has limited mobility and takes several minutes to arrive to the door, the proactive doorbell signal can be activated at a predetermined time before the doorbell ringer arrives as determined from the doorbell ringer data 160 such that the user and the doorbell ringer arrive at the door at substantially the same time to increase efficiency. That is, the embodiment can increase efficiency of delivery routes by delivery companies greatly by reducing the time waiting for an answer at the door. For example, the user and the doorbell ringer can arrive at the door within a predetermined time of each other (e.g., thirty seconds, one minute, two minutes, etc.) as determined by the user.

In one embodiment, the proactive doorbell signal can be based on calendar data 140 indicating that the user is in a meeting and it will take a predetermined amount of time to place the meeting on hold to answer the doorbell. Step 101 can cause the doorbell to notify the user of the doorbell ringer at the predetermined amount of time before the doorbell ringer arrives such that the doorbell ringer does not wait at the door.

In other words, Step 101 can cause the doorbell to perform a differentiated action comprising a proactive doorbell signal that activates the doorbell prior to the doorbell ringer arriving at the doorbell such that the user and the doorbell ringer arrive at the door at substantially a same time.

In step 102, the calendar is annotated with information based on the activation of the doorbell. For example, identifying information of the doorbell ringer associated with the doorbell ringer data 160 can be used to annotate the calendar. For example, the doorbell can include a fingerprint scanner that identifies the doorbell ringer. Of course, if the doorbell ringer does not wish to give up privacy, all the person must do is press the button with something other than a fingerprint region.

The information annotated on the calendar can include, for example, a mark or symbol on the calendar at the appropriate date and time (e.g., based on the doorbell data 130), an indication of how many times a button was pushed (and with the degree of pushing pressure indicated), information associated with the doorbell ringer (e.g. optionally supplied by a user's smartphone NFC capability, RFID tags, badge, biometric, facial recognition, voice recognition), a voice message recorded and stored as an attachment on the calendar, delivery information, a photo of the person pushing the doorbell used as annotation on the calendar, etc.

That is, in step 102 the user's calendar can be annotated with information based on the doorbell data 130 and the doorbell ringer data 160 e.g., to indicate a time that the doorbell was activated, who activated the doorbell, how many times the doorbell was activated, how long the doorbell ringer waited to be answered before leaving if not answered, etc.

The information annotated on the calendar in step 102 can include which doorbell was activated if the location has multiple doorbells (e.g., a front and back doorbell can leave different annotations on a calendar and the calendar may have a differential effect upon each doorbell). For example, if the doorbell ringer data 160 includes an unidentified user and the calendar data 140 does not identify any person expected (e.g., a delivery man), and the doorbell data 130 indicates that the back doorbell is activated (or that the back doorbell detects the doorbell ringer), the calendar can be annotated with an alert of suspicious activity.

The information annotated on the calendar can also include a video or audio feed (e.g., via a video or audio sensor) to supply a video message or audio message to the calendar.

In step 103 a model of user preferences can be learned. The model can be based on the calendar annotations in step 102 and the user's response to the calendar annotations to automatically change a next differentiated action in step 101 when a new event occurs. That is, based on the calendar annotations in step 102 and the actions taken by the users, a reinforcement learning mechanism can be performed in step 103 to create individual models for the users so that user preference models are learned for each individual user. Such models learned in Step 103 can facilitate an automatically performance of a differential action when an unknown situation arises based on the user's past actions, in step 104.

For example, if the user misses a parcel delivery, and the user indicates a preference that the delivery man could leave the parcel with a neighbor, in step 103, such preference may be learned through a reinforcement learning mechanism, that parcels could be left with the neighbor, even if the action is not explicit in the calendar data 140 or user data 150. Then, when the new event occurs (e.g., the next time a delivery man comes), in step 101 the delivery person is made aware (e.g., via an audio indication for example) that it is acceptable to leave the parcel with a neighbor.

Similarly, various settings of the doorbell may be learned for different cohorts of users. For example, if a cohort with some hearing impairment tend to requires five low-frequency rings with a sawtooth waveform instead of a standard one ring, Step 103 can learn the cohort profile and apply the cohort profile to individuals of the cohort profile over time so that the classes of users with some hearing impairment may benefit from the cohort learned data.

In step 104 a new differentiated action and/or a type of annotation for the calendar can be learned based on a past user action. That is, in step 104 actions can be learned to perform and/or indications placed on a calendar by monitoring a user's actions, such as muting a doorbell, not answering a doorbell, and providing other forms of feedback to optimally perform an action or annotate the calendar based on the past actions. For example, if the user never answers the door while eating dinner, such can be learned so that a do not disturb signal and/or the doorbell is muted during dinner time e.g., indicated by calendar data 140. In another example, if the user is detected as searching for an image of the doorbell ringer annotated on the calendar and the calendar annotations did not include a picture of the doorbell ringer, an image of the doorbell ringer can be added to the calendar. In other words, the method 100 adapts over time to be personalized to the user.

Thus, one or more embodiments of the present invention address at least one need in the art, by associating doorbell data with calendar data to cause the doorbell to perform a differentiated action (e.g., different action than merely emitting a noise) based on the calendar data and the doorbell data as well as annotate the calendar with information when the doorbell is activated. Therefore, features of the present invention improve over conventional techniques by providing better responses, response times, doorbell actions customized to both user preferences and user activity according to the user calendar, and can improve doorbell actions by learning past actions that did not optimally connect the doorbell ringer with the owner of the doorbell.

Exemplary Hardware Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 2, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring now to FIG. 2, computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety, of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 3:
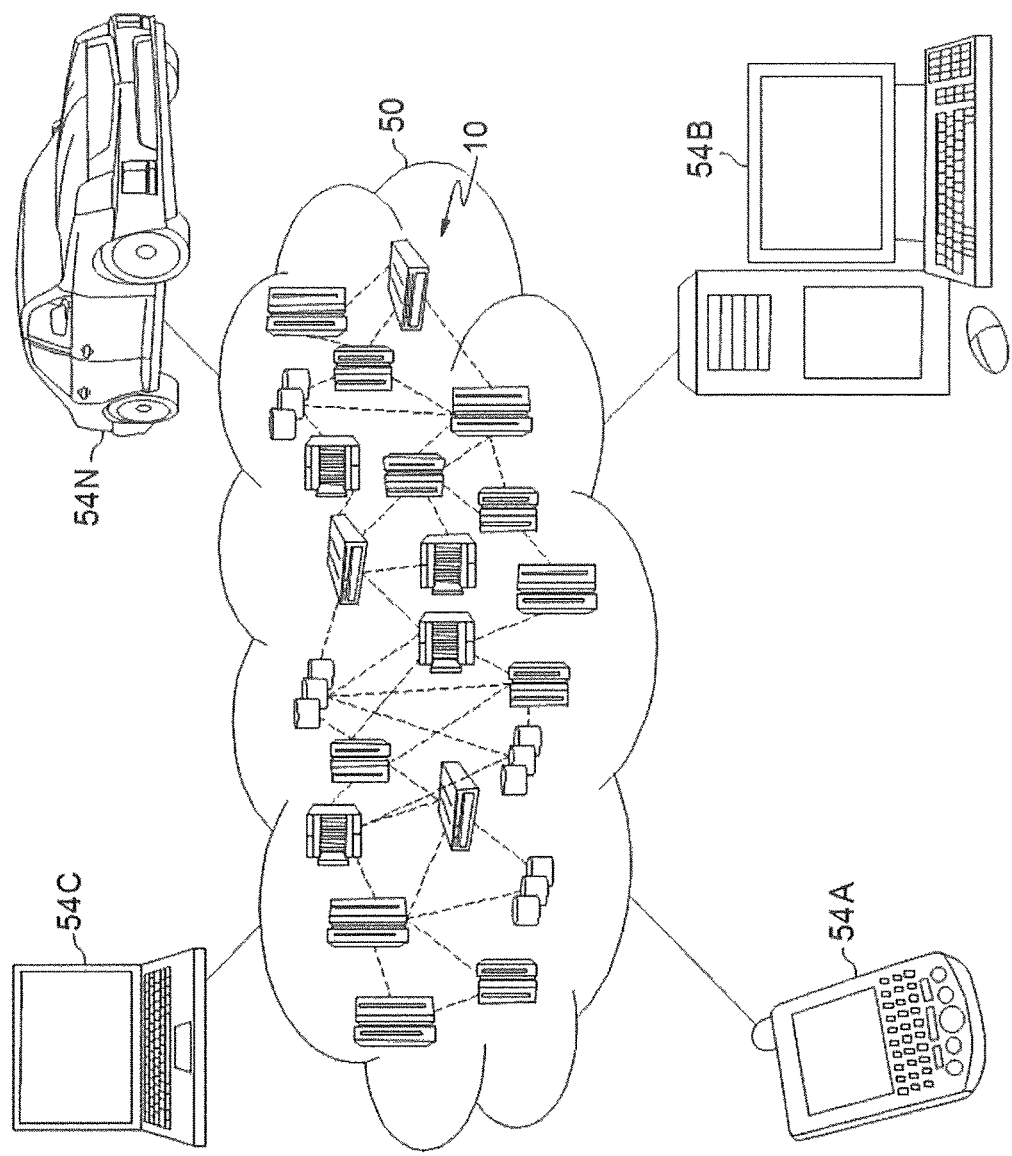
FIG. 3 depicts a cloud computing environment according to an embodiment of the present invention.

Referring now to FIG. 3, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 3 are intended to be illustrative only and that computing nodes 10 and cloud computing environment 50 can communicate with any type of computerized circuit over any type of network and/or network addressable connection (e.g., using a web browser).

Figure 4:
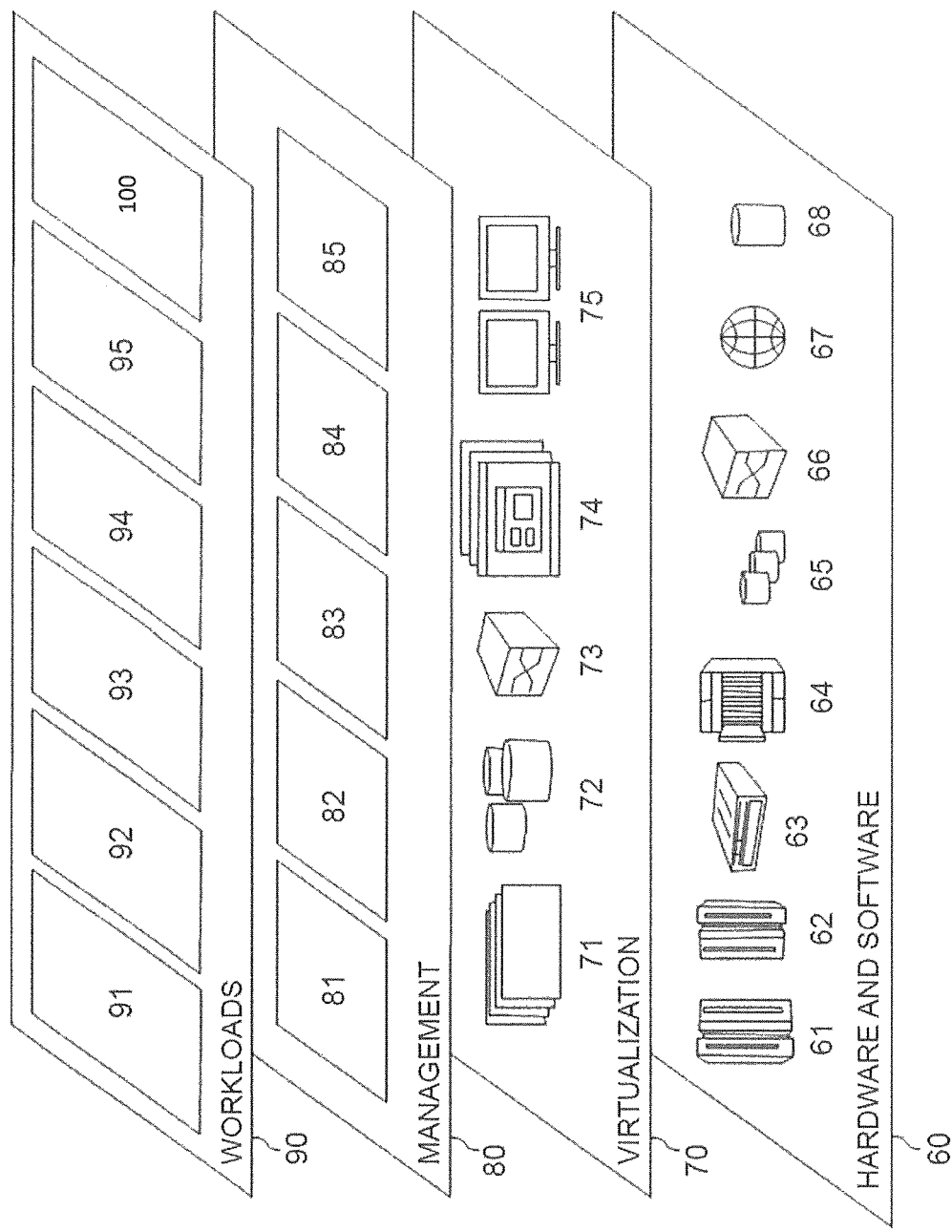
FIG. 4 depicts abstraction model layers according to an embodiment of the present invention.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the doorbell control method 100.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented doorbell control method, the method comprising:
   causing a doorbell to perform both a differentiated action and emission of a noise based on the differentiated action that is emitted separate from the differentiated action, the differentiated action being performed based on a relationship between both doorbell data and calendar data of an electronic calendar;
   annotating the calendar with information based on an activation of the doorbell; and
   learning a new differentiated action to perform and a type of annotation for the calendar based on a second user action during a situation in a first user action according to the calendar data, the second user action occurring at a time temporally after the first user action.

2. The method of claim 1, wherein the causing performs the differentiated action further based on user data and doorbell ringer data, and
   wherein the annotating uses the doorbell data and the doorbell ringer data to annotate a time that the doorbell was activated, an identity of the doorbell ringer, a number of times the doorbell was activated, and a length of time that the doorbell ringer waited to be answered before leaving.

3. The method of claim 1, wherein the diferentiated action comprises any of:
   muting an audio of the doorbell;
   changing a volume of the doorbell;
   changing an audio characteristic of the doorbell;
   converting an audio signal of the doorbell to a visual signal;
   sending a signal to an Internet of Things (IoT)-enabled device to emit a notification;
   sending a signal to a hearing aid; and
   conveying an automated message to a doorbell ringer, and
   wherein the information annotated on the calendar includes at least one of:
   a mark or a symbol on the calendar at the appropriate date and time;
   an indication of a number of times the doorbell was activated;
   doorbell ringer data;
   an audio message recorded and stored as an attachment on the calendar;
   a video message recorded and stored as an attachment on the calendar;
   delivery information; and
   a photo of the doorbell ringer.

4. The method of claim 1, wherein the differentiated action comprises causing the doorbell to emit an indication of a calendar-specific state based on the calendar data indicating a user response time to the activation of the doorbell.

5. The method of claim 1, wherein the differentiated action comprises a proactive doorbell signal that is performed in advance of the doorbell ringer arriving at the doorbell.

6. The method of claim 5, wherein a timing of the proactive doorbell signal is based on a time until a doorbell ringer arrives at the doorbell according to doorbell ringer data and a tune for the user to arrive at the doorbell based on the calendar data and user data.

7. The method of claim 6, wherein the time until the doorbell ringer arrives at the doorbell is within a predetermined threshold time of the time for the user to arrive at the doorbell.

8. The method of claim 6, wherein the causing causes the doorbell to perform the proactive doorbell signal when the time until the doorbell ringer arrives at the doorbell equals the time for the user to arrive at the doorbell.

9. The method of claim 1, wherein the causing causes the doorbell to perform a differentiated action comprising a proactive doorbell signal that activates the doorbell prior to a doorbell ringer arriving at the doorbell such that a user and the doorbell ringer arrive at the door at a same time.

10. The method of claim 1, wherein, if there are a plurality of doorbells, the annotated information comprises information on which doorbell was activated.

11. The method of claim 1, wherein the annotating annotates a plurality of calendars with the information if owners of the plurality of calendars are associated with the doorbell.

12. The method of claim 1, further comprising learning a user preference model based on the annotated information of the annotating and a user's response to the annotated information to automatically change a next differentiated action caused by the causing when a new event occurs.

13. The method of claim 1, further comprising learning the new differentiated action to perform and a type of annotation for the calendar for a cohort of users such that if the user is a part of the cohort, the causing performs the new learned differentiated action and the annotating annotates the calendar with the learned type of annotation for the cohort of users.

14. The method of claim 1, embodied in a cloud-computing environment.

15. A non-transitory computer-readable recording medium recording a doorbell control program for a doorbell, the program causing a computer to perform:
   causing a doorbell to perform both a differentiated action and emission of a noise based on the differentiated action that is emitted separate from the differentiated action, the differentiated action being performed based on a relationship between both doorbell data and calendar data of an electronic calendar;
   annotating the calendar with information based on an activation of the doorbell; and
   learning a new differentiated action to perform and a type of annotation for the calendar based on a second user action during a situation in a first user action according to the calendar data, the second user action occurring at a time temporally after the first user action.

16. The non-transitory computer-readable recording medium of claim 15, wherein the differentiated action comprises a proactive doorbell signal that is performed in advance of the doorbell ringer arriving at the doorbell.

17. The non-transitory computer-readable recording medium of claim 16, wherein a timing of the proactive doorbell signal is based on a time until a doorbell ringer arrives at the doorbell according to doorbell ringer data and a time for the user to arrive at the doorbell based on the calendar data and user data.

18. A doorbell control system for a doorbell, said system comprising:
   a processor; and
   a memory, the memory storing instructions to cause the processor to perform:
      causing a doorbell to perform both a differentiated action and emission of a noise based on the differentiated action that is emitted separate from the differentiated action, the differentiated action being performed based on a relationship between both doorbell data and calendar data of an electronic calendar;
      annotating the calendar with information based on an activation of the doorbell; and
      learning a new differentiated action to perform and a type of annotation for the calendar based on a second user action during a situation in a first user action according to the calendar data, the second user action occurring at a time temporally after the first user action.

19. The system of claim 18, embodied in a cloud-computing environment.

* * * * *